Sept. 15, 1936.  A. J. EBNER ET AL  2,054,315
TOWER GAS WASHER
Filed Oct. 22, 1934

Inventors
Alfred J. Ebner
Owen R. Rice.
Wilkinson, Huxley, Byron & Knight
Attys.

Patented Sept. 15, 1936

2,054,315

UNITED STATES PATENT OFFICE 2,054,315

TOWER GAS WASHER

Alfred J. Ebner and Owen R. Rice, Chicago, Ill., assignors to Freyn Engineering Company, Chicago, Ill., a corporation of Maine Application October 22, 1934, Serial No. 749,417

9 Claims. (Cl. 261—98)

The invention relates to gas washers of the stationary type and has particular reference to a tower washer in which the gas is introduced at the lower end and passes upwardly to the outlet at the top of the tower, being caused in its upward movement to contact wetted surfaces for separating the particles of dust and dirt from the gas stream and for cooling the gas.

An object of the invention is to provide a tower gas washer having three cleaning zones, each of which will subject the gas to a different washing action so that the particles of dust and dirt remaining in the gas after it has passed through the first zone will be removed either in the next or last zone.

Another object of the invention is to provide a tower gas washer which will direct the gas stream delivered thereto into contact with a wetted circular wall giving to the gas stream a whirling action to impel the solid particles carried along in the stream against said wet surfaces. An important feature with respect to the above resides in the novel means for continuously and uniformly wetting the surface of the circular wall, which will require a minimum of water and which will operate satisfactorily without periodic cleaning and repair.

Another object of the invention resides in the improved construction and arrangement of hurdles for a tower gas washer which will subject the gas to a plurality of wet surfaces disposed at an angle to the travel of the gas to more effectively cause impingement of the dust particles with the wet surfaces and to more effectually cause turbulence of the gas streams for enhancing the cooling effect upon the gas by its contact with wetted surfaces, which hurdles progressively decrease in size and spacing in an upward direction to provide more intimate contact surfaces for the dust in the gas, as the same becomes lower in concentration as it travels upwardly through the washer and more difficult of removal.

A further object of the invention is to provide hurdles having sloping sides meeting to form an apex which is directed in opposition to the gas flow to cause the dust particles in the gas to forcibly contact with the sloping sides.

A more specific object is to provide hurdles for a gas washer having an inverted "tear drop" shape in cross section and which are arranged in staggered relation vertically of the washer to secure the maximum cleaning effect with minimum water requirements.

With these and various other objects in view the invention may consist of certain novel features of construction and operation, as will be more fully described and particularly pointed out in the specification, drawing and claims appended hereto.

In the drawing which illustrates an embodiment of the invention and wherein like reference characters are used to designate like parts—

Figure 1:
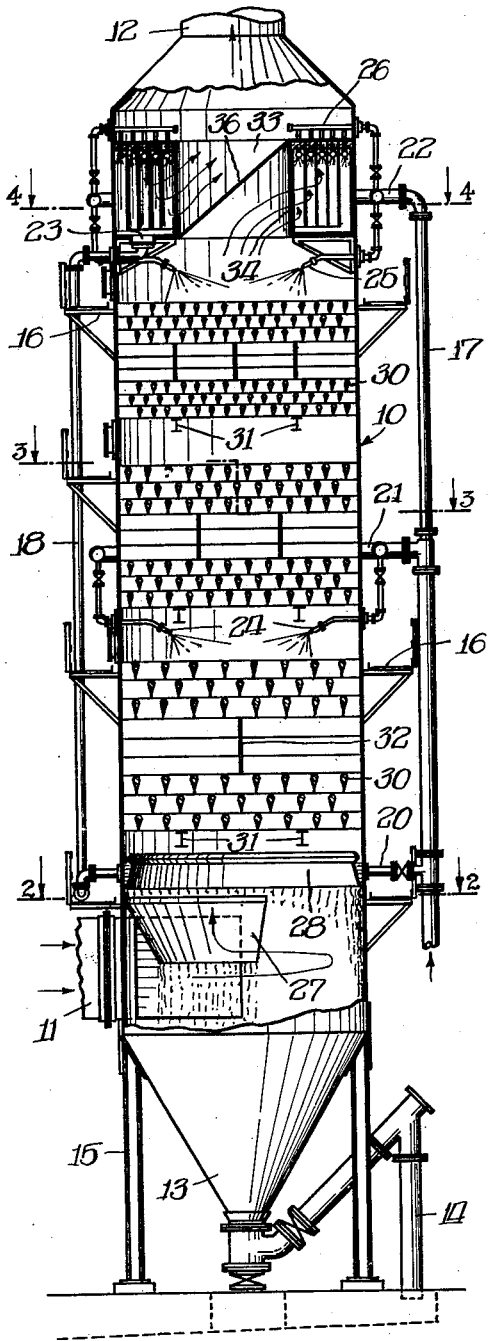
Figure 1 is a vertical cross sectional view of a tower washer embodying the improved features of the present invention.
Figure 4:
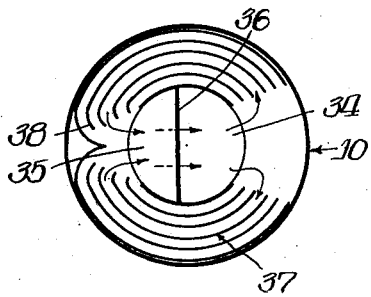
Figure 4 is a horizontal sectional view taken along line 4—4 of Figure 1.
Figure 3:
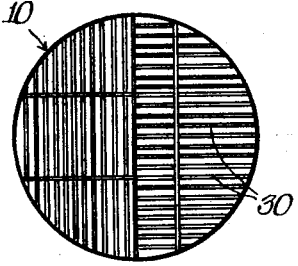
Figure 3 is a horizontal sectional view taken substantially along line 3—3 of Figure 1, showing the arrangement of the hurdles.
Figure 2:
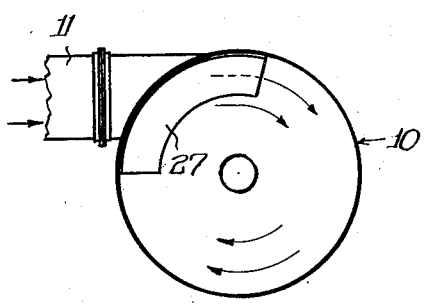
Figure 2 is a horizontal sectional view taken substantially along line 2—2 of Figure 1.

Referring particularly to Figure 1, the tower washer 10 is shown as having a gas inlet 11, a gas outlet 12, and sloping bottom walls 13 connecting with the fluid outlet pipe 14 constructed to form a trap for maintaining a water seal in the base of the tower.

The tower is suitably supported by the uprights 15 and is provided on its exterior with a plurality of platforms 16 located in spaced relation vertically of the tower for supporting an operator or attendant, and which also support the vertical water pipes 17 and 18. Pipe 17 joins with a water main at its lower end and connects with the auxiliary water supply pipes 20, 21, and 22. Auxiliary pipe 20 in turn joins with vertical pipe 18 which has connection at its upper end with trough 23, which collects the water from the last cleaning zone, whereby the same is supplied by pipe 18 for re-use in the first cleaning zone, as will be more particularly described. The auxiliary water supply pipe 21 has sprayers 24 connecting therewith while pipe 22 supplies water to the individual sprayers 25 and a plurality of headers 26, each feeding a number of sprayers.

An apron 27 of semi-circular form is suitably secured to the interior wall of the tower, adjacent the gas inlet 11, for catching the water dripping from the hurdles located intermediate of the tower to form a water curtain in front of the gas inlet and through which the gas stream must pass as it enters the tower. Secured to the interior wall of the tower above apron 27 is an annular member 28 concentric with the tower and supported in spaced relation thereto, to provide a small opening between the interior surfaces of the tower and the lower edge of the member. The space above said opening is supplied with water by the auxiliary pipe 20, which is discharged through the opening, the annular curtain of water thus formed maintaining the interior surface of the tower below the member in wet condition. Should this annular discharge opening become clogged in places, due to the dust and dirt particles in the gas, the water will overflow the top of member 28 and flow over the inside surfaces, whereupon it will be discharged from the lower edge to maintain a uniform water curtain which will continuously wet the circular wall against which the gas stream entering the tower is directed. The above comprises the first cleaning zone of the present tower washer. A large proportion of the dust particles is separated from the gas stream by the water discharged from apron 27, the remaining particles being tangentially impelled against the wet circular wall below member 28, due to the whirling action given the gas stream, with the result that some of the dust particles unite with the water and are carried to the bottom of the tower.

The second cleaning zone of the tower washer comprises a plurality of banks of hurdles 30, each bank being supported upon the beams 31 and comprising tiers of hurdles, the hurdles in one tier being staggered with respect to those in the tier next above. Each bank comprises a plurality of tiers forming the top and bottom thereof and having the hurdles disposed parallel and an intermediate section in which the hurdles run at right angles to those first described. Partitions 32 are used in each tier to separate the hurdles forming the said tier.

Figure 5:
Figure 5 is a detail sectional view taken transversely through several hurdles showing the improved cross sectional shape of the same.

The gases leaving the first cleaning zone pass upwardly through the network of hurdles, the surfaces of which are maintained wet by the sprayers 24 and 25, and which are arranged as described to avoid channeling of the gas streams to more effectively bring the particles of dust and dirt into contact with the sides of the hurdles. Referring particularly to Figure 5, the cross sectional shape of the hurdle is shown as an inverted "tear drop", which provides an arcuate upper portion and sloping sides meeting to form an apex which is directed downwardly to oppose the gas flow. Therefore, the gas in travelling upwardly through the tower will strike the sloping sides of the hurdle bars and which are staggered so that the gases passing through adjacent bars of one tier will be brought into contact with a bar in the next adjacent tier. The fact that the sides of the hurdles are disposed at an angle to the direction of gas flow constitutes an important factor in the high efficiency attained by the present tower washer, since the gases contact the sloping sides and cause the dust and dirt particles carried along in the gas streams to forcibly impinge against said sides, which are maintained in a wet condition by the water sprays, the water dripping from the hurdles above onto the bulbous portions of the hurdles below, part flowing down one side of the hurdle and part down the other side. The water again joins at the apex of said hurdle and drops to the hurdle below, the staggered arrangement of the hurdles effectively carrying out this mode of operation. In accordance with the invention the spacing and size of the bars employed on each bank progressively decrease in an upward direction. The arrangement takes care of the drop in the volume of the gas due to the decrease in temperature and also functions to provide more intimate contact surfaces for the dust and dirt in the gas as the same becomes lower in concentration as it travels upward through the tower and is consequently more difficult of removal.

The last cleaning zone of the tower washer consists of a circular housing located in the top of the tower and having top and bottom walls and a circular inner wall 33 concentric with the tower, the wall of the same forming the outside wall of the housing. The inner wall is provided with an inlet 34 and an outlet 35 which are separated by a diagonal wall 36 joining with the inner wall 33 of the housing and which extends from the base of the outlet to the top of the inlet. The inlet 34 is therefore open to the tower and gases entering the inlet are caused to flow through the housing, the gases dividing at the inlet and part flowing through one section of the housing and part through the other. Each section is provided with a plurality of vertical partitions 37, the sides of which are preferably lined with rubber and which depend from the top of the housing. The ends of the partitions terminate adjacent the outlet 35 in a decided curvature 38. Between the partitions 37 are located water sprays, as shown in Figure 1, which receive a supply of water from the headers 26. These sprays are intermittently operated to wash the rubber surface of the partitions of dust or dirt tending to lodge and accumulate thereon. The housing is provided in its bottom with a trough 23 for collecting the water discharged from the sprayers, the trough having connection with pipe 18 whereby the water may, if desired, be supplied to member 28 for use in the first cleaning zone.

In view of the foregoing it will be appreciated that the gas tower of the invention subjects the gas to an intensive cleaning and which is especially effective in removing the very fine and light particles of dirt. As each zone is different in its action on the gas, better cleaning results are secured. The large and heavy particles are removed in the first zone, being tangentially impelled into contact with the annular wall below member 28 and which is continuously and uniformly maintained in a wet condition. The hurdles effectively remove smaller and lighter particles which remain in the gas stream as it travels upwardly of the tower. The efficiency of the improved hurdle bars in maintaining the sloping sides thereof wet is responsible in a large measure for the highly satisfactory cleaning the gas is given in this intermediate zone.

In the last zone the gases are divided into a plurality of streams to materially increase the contact surface exposed to the dust particles, the dividing partitions being curved and concentrically disposed so as to divide the gas into substantially narrow annular streams and to impose upon the fine and comparatively buoyant dust particles still remaining in the gas a unidirectional force which is centrifugal force, and which is continuously acting upon said particles during their passage between said partitions so as to impose a radial movement upon said particles and bring them into contact with the wet rubber surfaces; the rubber surfaces being wet because the gas, after passing through the intensive spray systems in previous zones of the washer, is charged with entrained moisture which behaves similarly to the dust particles in contacting the rubber surfaces.

It is to be understood that we do not wish to be limited by the exact embodiment of the device shown, which is merely by way of illustration and not limitation, as various and other forms of the device will of course be apparent to those skilled in the art without departing from the spirit of the invention or the scope of the claims.

We claim:

1. A stationary gas washer comprising, in combination, a tower having a gas inlet and a gas outlet, said inlet being located in the base of the tower to one side of the center thereof for delivering the gases tangentially, a series of hurdles in said tower, means supplying water to the tower, and other means concentric with the inside wall of the tower and located above the gas inlet for distributing the water uniformly over the surface adjacent the inlet and against which the gases entering the tower are directed.

2. A stationary gas washer comprising, in combination, a tower having a gas inlet and a gas outlet, said inlet being located in the base of the tower to one side of the center thereof for delivering the gases tangentially, banks of hurdles located within the tower above the gas inlet, means supplying water to the hurdles, and an annular member concentric with the inside wall of the tower and located above the gas inlet for uniformly distributing water over the surface adjacent the inlet and against which the gases entering the tower are directed.

3. A stationary gas washer, comprising in combination, a tower having a gas inlet and a gas outlet, said inlet being located in the base of the tower to one side of the center thereof for delivering the gases tangentially, banks of hurdles located within the tower above the gas inlet, means supplying water to the hurdles, an apron located immediately above the gas inlet collecting the water dripping from the hurdles and forming a water curtain in front of said inlet, and an annular member concentric with the inside wall of the tower and located above the gas inlet for uniformly distributing water over the surfaces adjacent the inlet and against which the gases entering the tower are directed.

4. A stationary gas washer comprising, in combination, a tower having a gas inlet in the base thereof and a gas outlet at its top, a plurality of banks of hurdles located in said tower between the gas inlet and outlet, means located over certain banks of hurdles for supplying a liquid thereto, an annular member concentric with the inside wall of the tower and located above the gas inlet, said member providing a substantially diagonal wall directed inwardly at its upper end and forming at its base a narrow passage with respect to the inside wall of the tower, and means supplying a liquid to the space formed by said annular member, whereby said liquid is discharged through said narrow passage and is uniformly distributed over the surface adjacent the inlet and against which the gases entering the tower are directed.

5. A stationary gas washer comprising in combination, a tower having a gas inlet and a gas outlet, said inlet being located in the base of the tower to one side of the center thereof for delivering the gases tangentially, a plurality of banks of hurdles located within the tower between the gas inlet and outlet, means located over certain banks of hurdles supplying a liquid thereto, an apron located immediately above the gas inlet collecting the liquid dripping from the hurdles and forming a liquid curtain in front of said inlet, an annular member concentric with the inside wall of said tower and located above said apron, said member providing a substantially diagonal wall forming a space with the inside wall of the tower and a narrow passage at its lower end, and means supplying a liquid to said space formed by the annular member, whereby liquid is discharged through said narrow passage and is uniformly distributed over the surfaces adjacent the inlet and against which the gases entering the tower are directed.

6. A stationary gas washer comprising, in combination, a tower having a gas inlet at the base and an outlet at the top, a plurality of washing zones within said tower, each having independent means for cleaning the gases flowing through the tower, the gas cleaning means of the first zone including an annular member located above the gas inlet and providing a space with the inside wall of the tower for containing a liquid, an outlet at the base of said member for uniformly distributing the liquid over the surface adjacent the inlet and against which the gases entering the tower are directed, and means collecting the liquid discharged in the last of said washing zones and delivering the same to the container formed by said annular member for reuse in the first washing zone.

7. A stationary gas washer comprising, in combination, a tower having a gas inlet at the base and an outlet at the top, a plurality of washing zones in said tower, each having independent means for cleaning the gases flowing through the tower, the gas cleaning means of the last zone including a plurality of curved partitions for imposing a radial movement on the dust particles carried along in the gas streams, and means for wetting the sides of said partitions, the gas cleaning means of the first zone including an annular member above the gas inlet for collecting a liquid, the base of said member providing a narrow passage for discharging said liquid and uniformly distributing the same over the surfaces adjacent the inlet and against which the gases entering the tower are directed, and means collecting the liquid discharged in the last zone and delivering the same for reuse in the first washing zone.

8. A stationary gas washer comprising, in combination, a gas tower having an inlet in the base thereof and an outlet at the top, a plurality of washing zones within said tower for successively cleaning the gases flowing through the tower with varying intensity, each zone having independent gas cleaning means, the last washing zone including a plurality of curved partitions imposing a radial movement on the dust particles carried along in the gas streams, and means for wetting the surfaces of said partitions, the intermediate washing zone including a plurality of hurdle bars, and means for wetting the surfaces of said bars, and the gas cleaning means of the first zone including a reservoir for collecting and uniformly discharging a wetting medium over the surfaces adjacent the inlet and against which the gases entering the tower are directed, said gas cleaning means of the first zone reusing the wetting medium discharged in said last zone.

9. A stationary gas washer comprising, in combination, a tower having a gas inlet at the base thereof and an outlet at the top, a plurality of banks of hurdle bars supported within said tower between said inlet and outlet, liquid spraying means located in the tower above certain of said banks of hurdle bars and connecting with a source of liquid supply, said hurdle bars having an arcuate top portion and sloping sides meeting to form an apex which is directed downwardly in opposition to the flow of gas upwardly through the tower, each bank of hurdle bars including a plurality of tiers having the bars of one tier staggered with respect to those of an adjacent tier, and wherein certain tiers comprise bars disposed at right angles to those of other tiers.

ALFRED J. EBNER.
OWEN R. RICE.